US006944455B2

United States Patent
Bonta et al.

(10) Patent No.: US 6,944,455 B2
(45) Date of Patent: Sep. 13, 2005

(54) SELECTIVE NETWORKING METHOD FOR MOBILE AD HOC NETWORKS

(75) Inventors: Jeffrey D. Bonta, Arlington Heights, IL (US); Ye Chen, Schaumburg, IL (US); James P. Michels, Elk Grove Village, IL (US)

(73) Assignee: Motorola, Inc., Schaumburg, IL (US)

( * ) Notice: Subject to any disclaimer, the term of this patent is extended or adjusted under 35 U.S.C. 154(b) by 164 days.

(21) Appl. No.: 10/159,994

(22) Filed: May 31, 2002

(65) Prior Publication Data

US 2003/0224793 A1 Dec. 4, 2003

(51) Int. Cl.$^7$ ............................................... H04Q 7/20

(52) U.S. Cl. ...................... 455/449; 455/446; 370/338

(58) Field of Search .............................. 455/41.1–41.3, 455/445, 446, 449, 452.1, 452.2, 67.11, 67.13; 370/400, 401, 328, 338, 477, 437, 462; 709/249, 252, 208, 209

(56) References Cited

U.S. PATENT DOCUMENTS

| | | | | |
|---|---|---|---|---|
| 2002/0064134 A1 | * | 5/2002 | Lee et al. | 370/252 |
| 2002/0193073 A1 | * | 12/2002 | Fujioka | 455/41 |
| 2003/0063655 A1 | * | 4/2003 | Young | 375/132 |
| 2003/0076842 A1 | * | 4/2003 | Johansson et al. | 370/401 |

* cited by examiner

*Primary Examiner*—Jean Gelin
(74) *Attorney, Agent, or Firm*—Kenneth A. Haas (57) ABSTRACT

A method of selecting one or more active slave wireless devices from a plurality of active/parked slave wireless devices is implemented by a master wireless device. The master wireless device initially assigns sequential weights to each active/parked slave wireless device, and subsequently designates one or more of the active/parked slave wireless devices as active slave wireless device(s) based partially or entirely on the assigned sequential weights. The assignment of sequential weights can be accomplished by assigning each active/parked slave wireless device to one of a plurality of ranked groups collectively representative of various traffic types between a base site and the active/parked slave wireless devices. Each active/parked slave wireless device is then sorted within its respective group.

26 Claims, 8 Drawing Sheets

SELECTIVE NETWORKING METHOD FOR MOBILE AD HOC NETWORKS

FIELD OF THE INVENTION

The present invention generally relates to methods for establishing a mobile ad hoc network. More specifically, the present invention relates to an establishment of a mobile ad hoc network that facilitates an achievement of a maximum number of active slave wireless devices having a highest throughput.

BACKGROUND OF THE INVENTION

Figure 1:
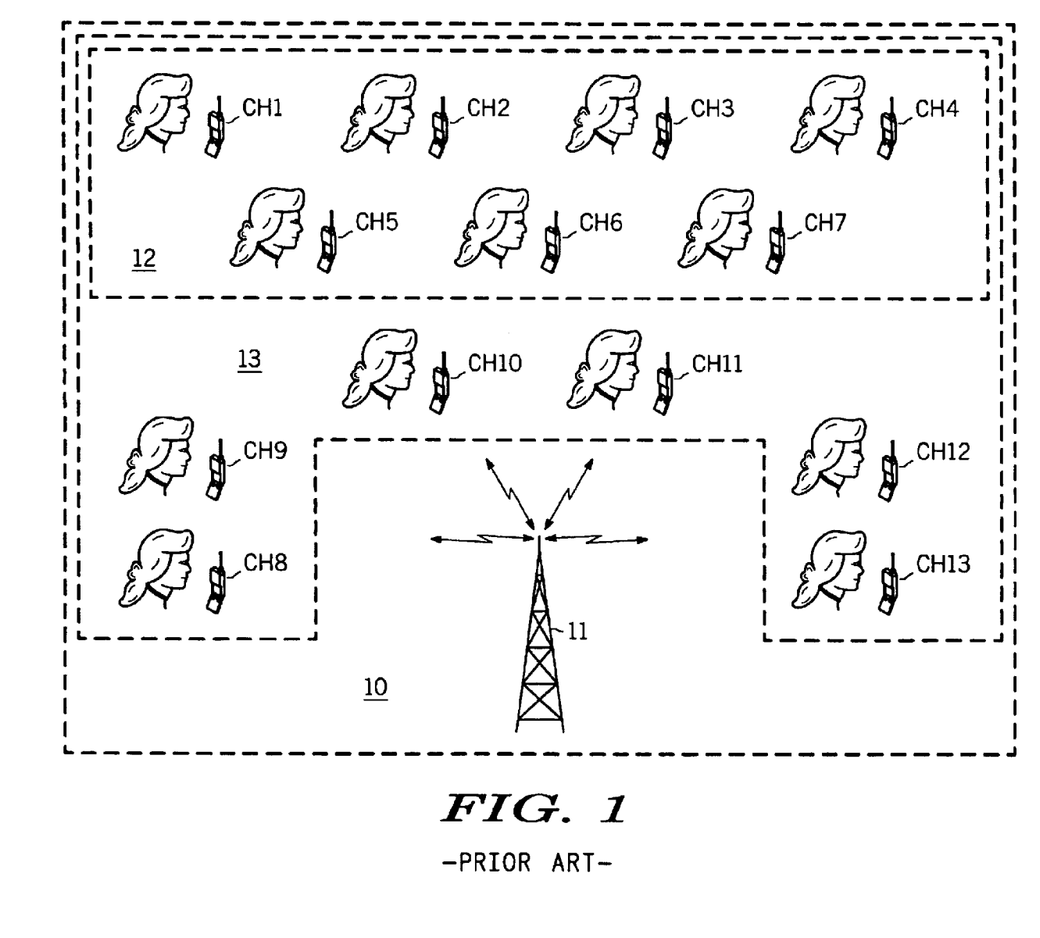
FIG. 1 illustrates an exemplary piconet as known in the art.

Ad hoc networking is a technology that enables wireless devices to form a cooperative communication network. Currently, there are various known air interfaces that support ad hoc networking, such as, for example, 802.11 and Bluetooth. Other well known fixed wireless networks (e.g., cellular) communicate through a point-to-multipoint configuration and depend on wide area coverage to deliver service to the end user. However, this type of configuration is not always capable of providing an adequate signal to the entire coverage area due to physical obstructions such as buildings that impede the signal. FIG. 1 illustrates an application of ad hoc networking that utilizes a known air interface to extend coverage for cellular systems, thus forming a hybrid communications network using ad hoc networking and cellular networking.

Cellular handsets CH1–CH13 are dual mode handsets capable of interoperating between a known cellular air interface, such as Wideband Code Division Multiple Access, and a known ad hoc networking air interface, such as Bluetooth. Thus, these cellular capable handsets CH1–CH13 are capable of forming a local ad hoc network by utilizing the Bluetooth device contained within the cellular handset. As a Bluetooth device, the local ad hoc network is referred to as a piconet. A Bluetooth piconet consists of a master device and some number of slave devices. A Bluetooth piconet typically has up to 7 active slaves that share a channel with the master. In addition, many more slaves can remain synchronized with the master in a parked state, but do not share the same channel. These parked slaves have less frequent communication with the master than the active slaves have with the master. When the Bluetooth device within a cellular handset CH1–CH13 is the master of a piconet, then the cellular handset is a master cellular handset of the piconet. Likewise, when the Bluetooth device within a cellular handset CH1–CH13 is a slave, then the cellular handset is either an active slave cellular handset or a parked slave cellular handset depending on its state within the piconet.

Cellular handsets CH1–CH7 are shown within a coverage hole 12 of a cellular wide area network ("WAN") 10 having a cell site 11. The coverage hole 12 impedes cellular handsets CH1–CH7 from receiving an adequate cellular signal from the cell site 11. Cellular handsets CH8–CH13 have adequate coverage with the cell site 11, and the cellular handsets CH1–CH 7 therefore attempt to utilize the Bluetooth air interface to establish and maintain a voice call and/or a data call with one of the cellular handsets CH8–CH13 that is designated as the master. Another application of ad hoc networking is to utilize a dual mode cellular/air interface capability of the master to extend the capacity of the remaining cellular handsets among the cellular handsets CH8–CH13.

The cellular handsets CH1–CH13 form an exemplary piconet 13 having a master, one or more active slave cellular handsets being served by the master, and one or more parked slave cellular handsets. One known method for forming the piconet 13 designates the first cellular handset among cellular handset CH8–CB13 within the piconet 13 as the master with the remaining cellular handsets being designated as active or parked based on an order of appearance with the piconet 13 and the limit of active slave cellular handsets that can be served by the master. A shortcoming of this known method is the piconet 13 experiences limited throughput gains due in part to the designation of the slave cellular handsets as active or parked without regard to the capabilities of each slave cellular handset. Furthermore, the active slave cellular handsets may not be an optimal set of active slave cellular handsets to achieve the best throughput of piconet 13. For example, one or more active slave ecllular handsets may have the capability of receiving data directly from cell site 11 at a minimum data rate of 144 kbit/sec while some of the parked slave cellular handsets may not have the capability of receiving data directly from cell site 11 at a minimum data rate of 144 kbit/sec. Another shortcoming of the known method is the active slave cellular handsets having a low data rare relative to other active slave cellular handsets do not get priority in communicating with the master, and the average throughput of the piconet 13 can be significantly reduced.

The present invention advances the art by providing a method for facilitating a selection of an optimal set of active slaves within a piconet.

SUMMARY OF THE INVENTION

One form of the present invention is a first method of operating a master wireless device in designating one or more active slave wireless devices from a plurality of slave wireless devices. First, the master wireless device assigns sequential weights to each slave wireless device. Second, the master wireless device designates one or more of the slave wireless devices as the active slave wireless device(s) based partially or entirely on the assigned sequential weights.

A second form of the present invention is a second method of operating a master wireless device in designating one or more active slave wireless devices from a plurality of slave wireless devices. First, the master wireless device assigns each slave wireless device to one group of a plurality of ranked groups representative of various types of traffic types with a base site. Second, the master wireless device sorts the slave wireless devices within each group having two or more slave wireless devices. Third, the master wireless device designates one or more slave wireless devices as the active slave wireless device(s) based partially or entirely on a ranking of the groups and the sorting within each group.

A third form of the present invention is a third method of operating a master wireless device in designating one or more active slave wireless devices from a plurality of slave wireless devices. First, the master wireless device conditionally designates each slave wireless device within a first group as an active slave wireless device. The first group is representative of slave wireless devices lacking coverage with a base site. Second, the master wireless device conditionally designates each slave wireless device within a second group as an active slave wireless device. The second group is representative of slave wireless devices having adequate coverage with the base site and a data call associated with a data rate less than a minimum data rate threshold associated with the base site. Third, the master wireless device conditionally designates each slave wireless device within a third group as an active slave wireless device. The third group is representative of slave wireless devices having adequate coverage with the base site and a data call associated with a data rate equal to or greater than the minimum data rate threshold.

The foregoing forms and other forms as well as features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 2:
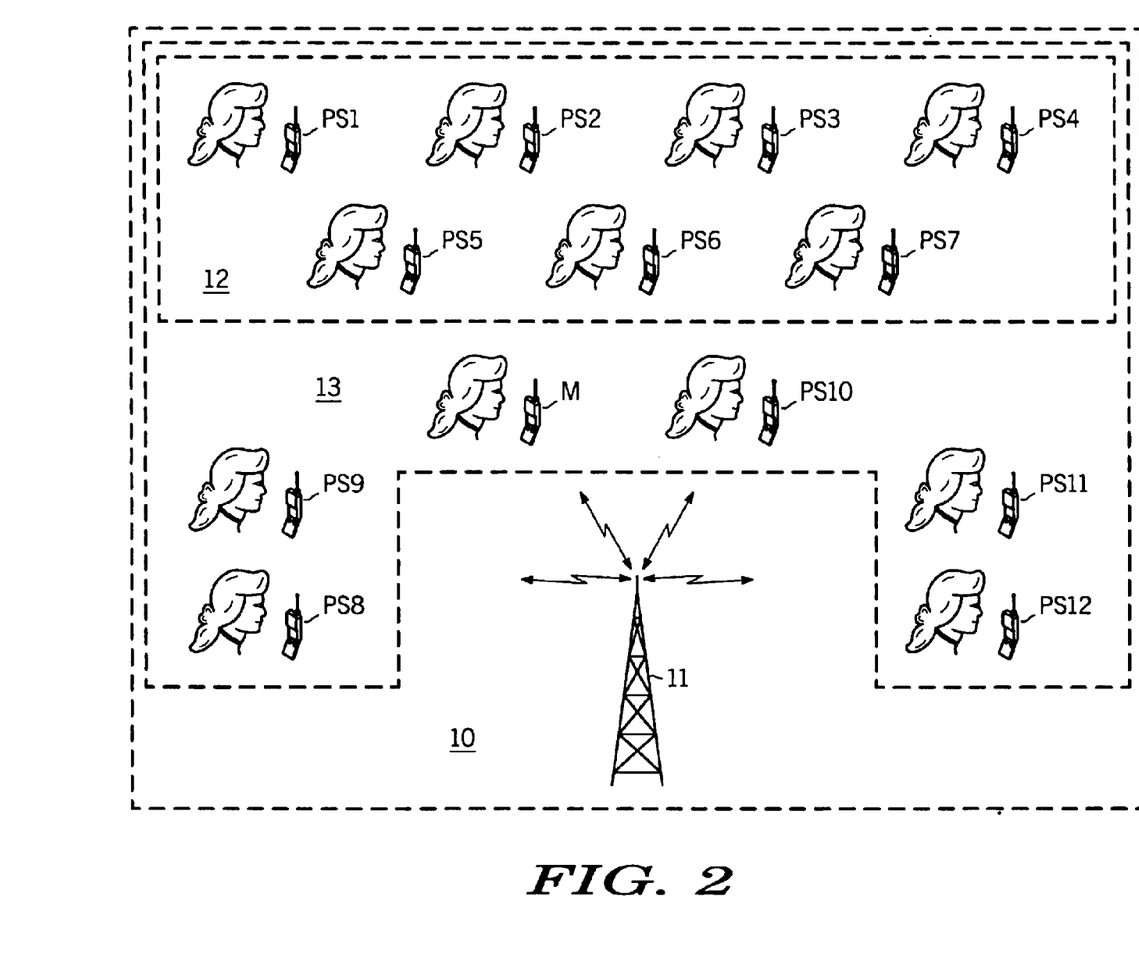
FIG. 2 illustrates exemplary designations of masters and slaves within the FIG. 1 piconet.

FIG. 2 illustrates exemplary designations within the piconet 13 of a master M, and twelve (12) parked slaves PS1–PS12. These exemplary designations are to facilitate a description of a concurrent attempt by the parked slaves PS1–PS12 to be designated as an active slave of the piconet 13.

Figure 3:
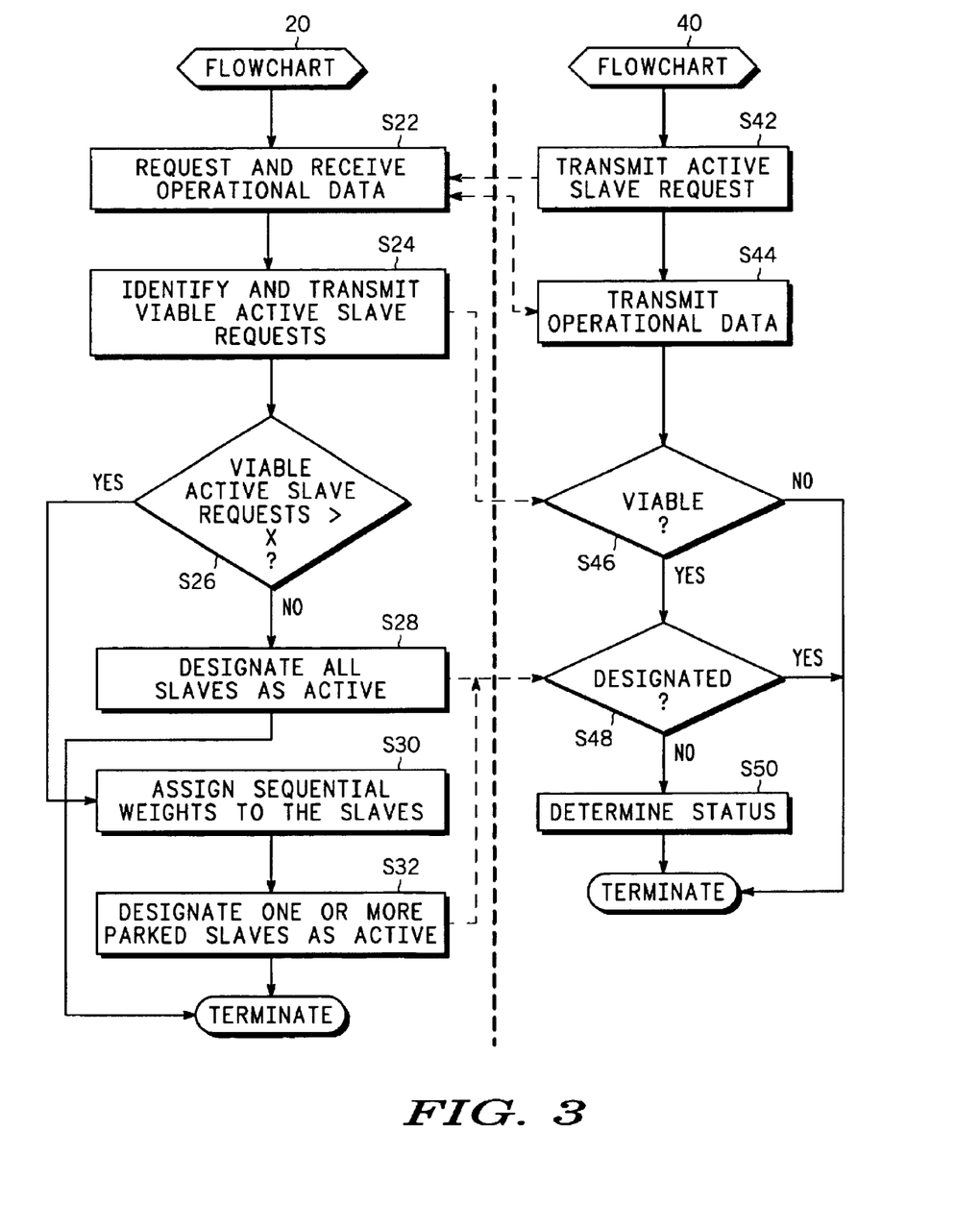
FIG. 3 illustrates a pair of flowcharts representative of an active slave selection method in accordance with one embodiment of the present invention.

FIG. 3 illustrates a flowchart 20 and a flowchart 40 collectively representative of an active slave selection method of the present invention. During a stage S42 of the flowchart 40, the parked slaves PS1–PS12 each conventionally transmit a request to be designated as an active slave. In response thereto, during a stage S22 of the flowchart 20, the master M requests and receives operational data corresponding to the parked slave PS1–PS12 as transmitted by the parked slaves PS1–PS12 during a stage S44 of the flowchart 40. In one embodiment, the operational data includes information related to (1) an indication of cellular coverage by each parked slave PS1–PS12, (2) a data rate required of each parked slave PS1–PS12, (3) a data rate available to each parked slave PS1–PS12 through a direct connection with the cell site 11, (4) a labeling of a call traffic type by each parked slave PS1–PS12 as either real-time data such as voice or VoIP, or non-real time data such as e-mail, and (5) the transmit power of each parked slave PS1–PS12.

During a stage S24 of the flowchart 20, the master M identifies and transmits all viable active slave requests. In one embodiment, the master M identities an active slave request as being viable if the operational data associated with the corresponding parked slave indicates the parked slave can not achieve a data rate through a direct connection with the cell site 11 that is greater than the data rate achieved by the master M through a direct connection with the cell site 11. The transmission therefore indicates which of the active slave request(s) have been identified as viable by the master M whereby each parked slave having an active slave request identified as being not viable, if any, can proceed to terminate the flowchart 40 during a stage S46 of the flowchart 40.

For purposes of the facilitating the remaining description of the flowchart 20 and the flowchart 40, the remaining stages of the flowchart 20 and the flowchart 40 will be described as if all of the active slave requests from the parked slaves PS1–PS12 were identified as viable by the master M during the stage S24.

During a stage S26 of the flowchart 20, the master M determines whether the number of viable active slave requests exceeds a maximum active slave limit X. If the master M determines the number of viable active slave requests is less than or equal to the maximum active slave limit X, then the master M would proceed to a stage S28 of the flowchart 20 to designate all of the parked slaves PS1–PS12 as active slaves. In response thereto, each parked slave PS1–PS12 would recognize its active designation during a stage S48 of the flowchart 40.

For purposes of the facilitating the remaining description of the flowchart 20 and the flowchart 40, the remaining stages of the flowchart 20 and the flowchart 40 will be described as if the maximum active slave limit is three (3). Accordingly, when the master M determines the number of received active slave requests from the parked slaves PS1–PS12 is greater than the maximum active slave limit X during the stage S26, the master M proceeds to a stage S30 of the flowchart 20 to assign sequential weights to each parked slave PS1–PS12. In one embodiment, the assignment of the sequential weights involves assigning a number to each parked slave PS1–PS12 based upon specified criteria, such as, for example, an order of received active slave requests from the parked slaves PS1–PS12. In a second embodiment, the master M implements a sequential assignment weighting method of the present invention.

Figure 4:
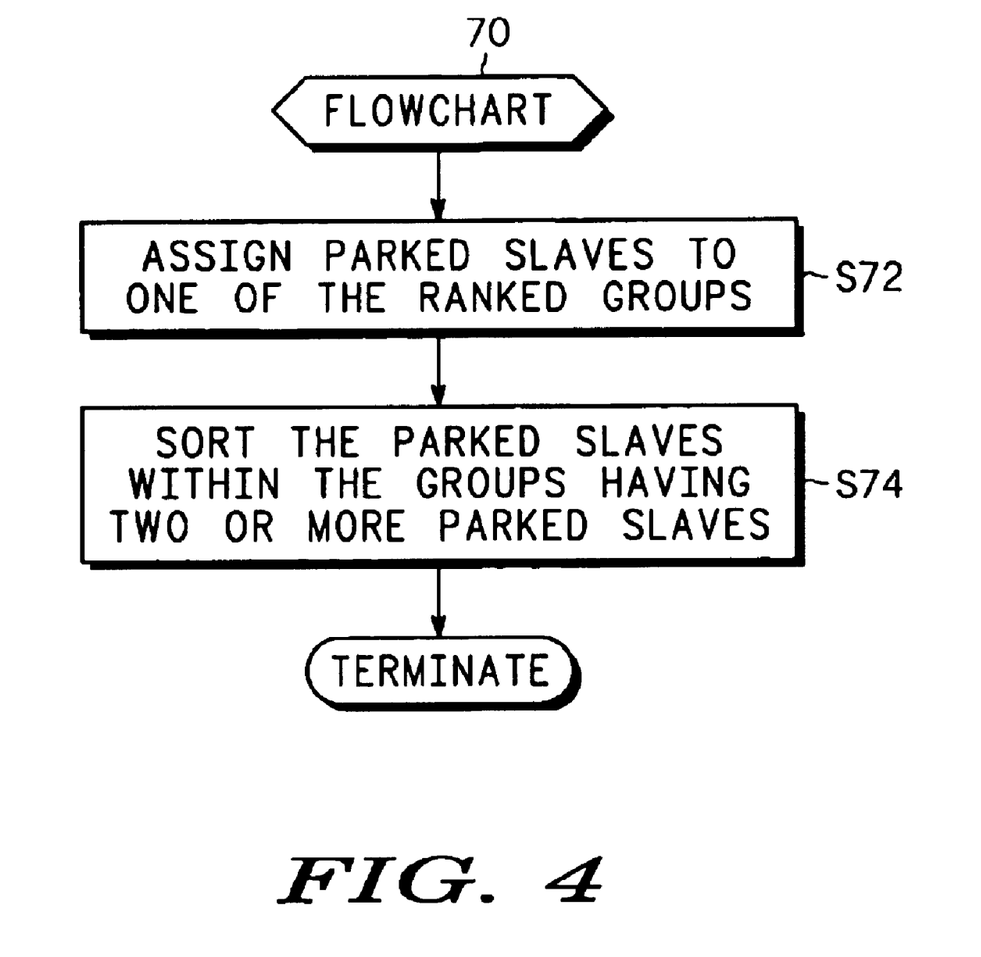
FIG. 4 illustrates a flowchart representative of a sequential assignment weighting method in accordance with one embodiment of the present invention.

FIG. 4 illustrates a flowchart 70 representative of a sequential assignment weighting method of the present invention. During a stage S72 of the flowchart 70, the master M attempts to assign each parked slave PS1–PS12 to one of a plurality of ranked groups based on the operational data of the parked slaves PS1–PS12. In one embodiment, each group is representative of one type of various cellular traffic types between the cell site 11 (FIG. 1) and the parked slaves PS1–PS12. The following TABLE 1 has an exemplary listing of ranked groups in ascending order:

TABLE 1

| GROUP | REPRESENTATION |
|---|---|
| 1A | No usable coverage with the cell site 11 to support any type of call. Required traffic type is a voice call. |
| 1B | No usable coverage with the cell site 11 to support any type of call. Required traffic type is a data call. |
| 2 | Adequate coverage with the cell site 11 to support any type of call. Required traffic type is a data call having an available data rate with cell site 11 < a minimum system data rate threshold (e.g., 144 kbit/sec). |

TABLE 1-continued

| GROUP | REPRESENTATION |
|---|---|
| 3 | Adequate coverage with the cell site 11 to support any type of call. Required traffic type is data call having an available data rate with cell site 11 the minimum system data rate threshold. |

Group 2 can be further defined to exclude each parked slave having a required data rate less than an available data rate with the cell site 11.

In other embodiments, the groups can be representative of other factors, such as for example, the adequacy of the coverage with the cell site 11.

For purposes of the facilitating the remaining description of the flowchart 20 and the flowchart 40, the following TABLE 2 lists an exemplary assignment of each parked slave PS1–PS12 to one of the TABLE 1 ranked groups:

TABLE 2

| GROUP 1A | GROUP 1B | GROUP 2 | GROUP 3 |
|---|---|---|---|
| PS1 | PS2 | PS8 | PS9 |
| PS5 | PS3 | PS10 | PS11 |
| PS6 | PS4 | | PS12 |
| | PS7 | | |

During a stage S74 of the flowchart 70, the master M sorts the parked salves within each group in ascending order in accordance with a specified criteria, such as, for example, (1) transmit power required to maintain a communication link at an acceptable rate between the master M and a corresponding parked slave, (2) the data rate requested by each parked slave PS1–PS12, (3) the quality of the link between the master M and each parked slave PS1–PS12, (4) the time that each parked slave PS1–PS12 has been a parked slave of the master M, and/or other criteria as would occur to those having ordinary skill in the art. For purposes of the facilitating the remaining description of the flowchart 20 and the flowchart 40, the following TABLE 3 list an exemplary ascending sorting of each parked slave PS1–PS12 within respective TABLE 1 ranked groups:

TABLE 3

| GROUP 1A | GROUP 1B | GROUP 2 | GROUP 3 |
|---|---|---|---|
| PS6 | PS4 | PS8 | PS11 |
| PS1 | PS7 | PS10 | PS9 |
| PS5 | PS3 | | PS12 |
| | PS2 | | |

Referring again to FIG. 3, during a stage S32 of the flowchart 20, the master M designates one or more active slaves among the parked slaves PS1–PS12 based entirely or partially on the sequential weighting of the parked slaves PS1–PS12 whereby each parked slave PS1–PS12 designated as active would recognize its active designation during the stage S48. In one embodiment, during the stage S32, the master M sequentially implements a Group 1 A designation method, a Groups 1B/2 designation method, and a Group 3 designation method.

Figure 5:
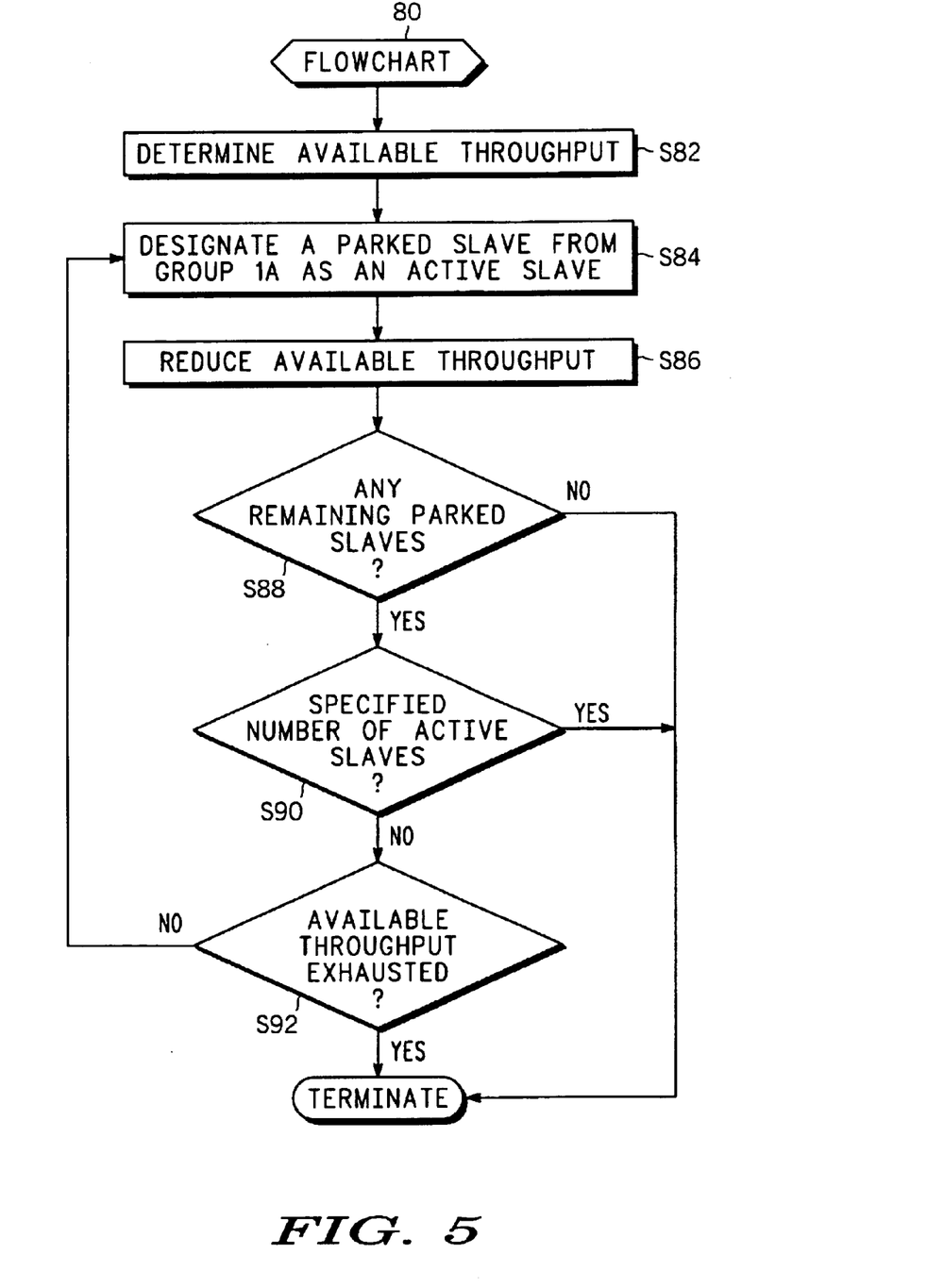
FIG. 5 illustrates a flowchart representative of a Group 1A designation method in accordance with one embodiment of the present invention.

FIG. 5 illustrates a flowchart 80 representative of the Group 1A designation method of the present invention. During a stage S82 of the flowchart 80, the master M conventionally determines the available throughput AT. In one embodiment, the available throughput AT is limited to a throughput TH1 representative of a throughput that the master M can maintain with the cell site 11 (FIG. 1) when a throughput TH2 representative of a cumulative throughput that the master M can maintain with each parked slave PS1–PS12 is greater than the throughput TH1. Otherwise, the available throughput AT is limited to the throughput TH2.

During a first implementation of the stage S84 of the flowchart 80, the master M designates the parked slave PS6 as an active slave in accordance with TABLE 3. During a stage S86 of the flowchart 80, the cellular handset M adjusts the available throughput AT by reducing the throughput required by the parked slave PS6 from the available throughput AT. The master M thereafter conditionally performs a second implementation of the stages S84 and S86 to thereby designate the parked slave PS1 as an active slave in accordance with TABLE 3, and a third implementation of the stages S84 and S86 to thereby designate the parked slave PS5 as an active slave in accordance with TABLE 3. A first condition for subsequent implementation of the stages S84 and S86 is a determination of any remaining parked slaves within the Group 1A during a stage S88 of the flowchart 80. A second condition is a determination during a stage S90 of the flowchart 80 as to whether the number of parked slaves designated as active equals a specified number of active slaves to be supported by the master M. The specified number can equal a maximum number of active slaves that can be supported by the master M or a practical number of active slaves to be supported by the master M. A third condition is a determination during a stage S92 of the flowchart 80 as to whether the available throughput AT has been exhausted by the designated active slaves.

Upon termination of the flowchart 80, the master M proceeds to implement a Groups 1B/2 designation method unless the number of designated cellular handsets equals the maximum number of active slaves or the available throughput AT has been exhausted during the implementation of the flowchart 80.

Figure 6:
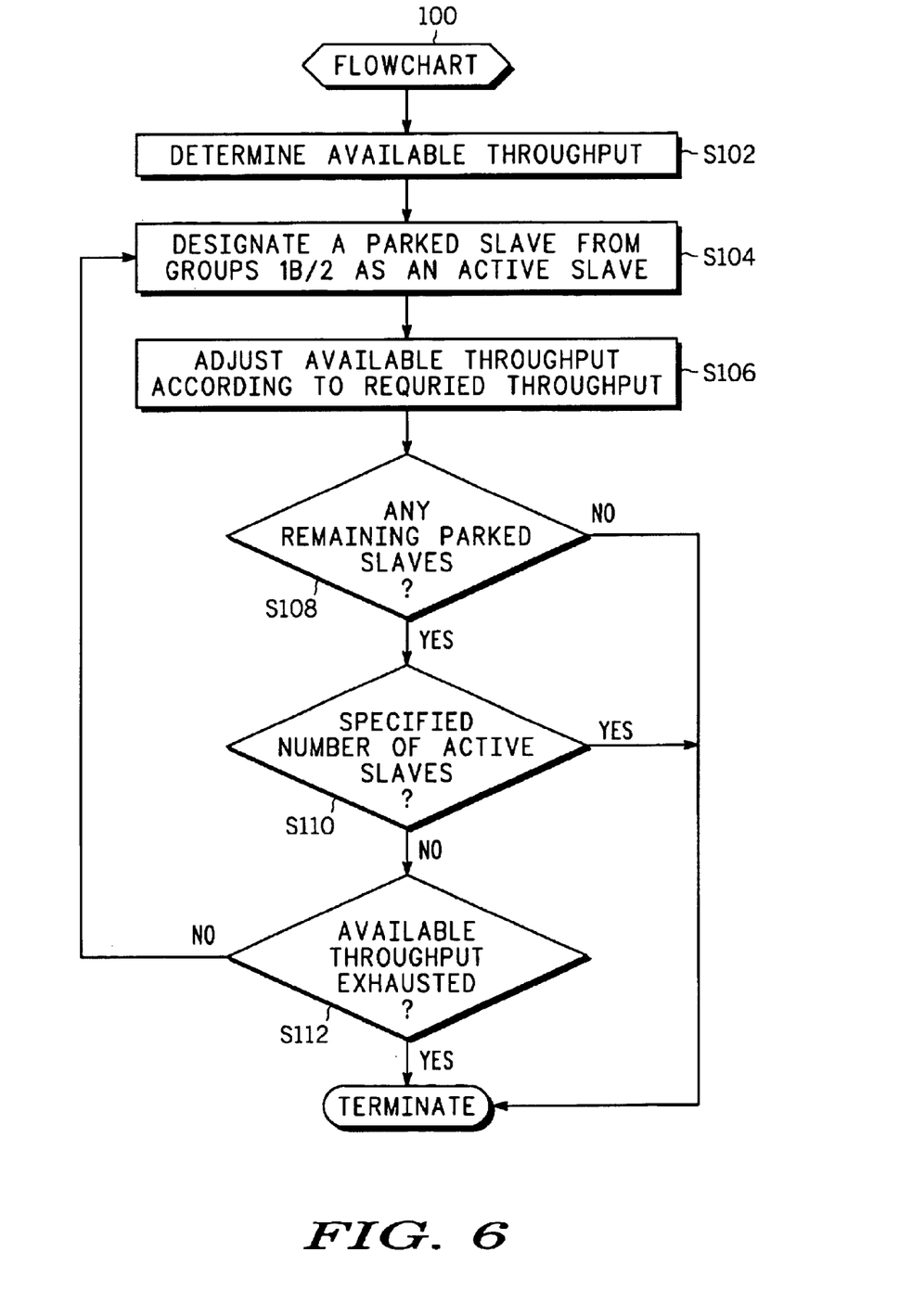
FIG. 6 illustrates a flowchart representative of a Groups 1B/2 designation method in accordance with one embodiment of the present invention.

FIG. 6 illustrates a flowchart 100 representative of the Groups 1B/2 designation method of the present invention. During a stage S102 of the flowchart 100, the master M determines the available throughput AT based upon a reduction or cumulative reductions of the available throughput AT from the implementation of flowchart 80. During a first implementation of the stage S104 of the flowchart 100, the master M designates the parked slave cellular handset PS4 as an active slave in accordance with TABLE 3. During a stage S106 of the flowchart 100, the cellular handset M adjusts the available throughput AT by subtracting the throughput required by the parked slave PS4 from the available throughput AT. The master M thereafter conditionally performs a second implementation of the stages S104 and S106 to designate the parked slave PS7 as an active slave in accordance with TABLE 3, a third implementation of the stages S104 and S106 to thereby designate the parked slave PS3 as an active slave in accordance with TABLE 3, a fourth implementation of the stages S104 and S106 to thereby designate the parked slave PS2 as an active slave in accordance with TABLE 3, a fifth implementation of the stages S104 and S106 to thereby designate the parked slave PS8 as an active slave in accordance with TABLE 3, and a sixth implementation of the stages S104 and S106 to thereby designate the parked slave PS10 as an active slave in accordance with TABLE 3. In view of the fact that parked slaves of Groups 1B/2 require data calls, each designated parked slave will share the available throughput. Accordingly, any subsequent implementation(s) of the stage S106 involves an adjustment of the available throughput to reflect the highest throughput requirement by a designated parked slave of Groups 1B/2.

A first condition for subsequent implementation(s) of the stages S104 and S106 is a determination of any remaining parked slaves within the Groups 1B/2 during a stage S108 of the flowchart 100. A second condition is a determination during a stage S110 of the flowchart 100 as to whether the number of designated cellular handsets equals the specified number of active slaves. A third condition is a determination during a stage S112 of the flowchart 100 as to whether the available throughput AT has been exhausted by the designated cellular handsets.

Upon termination of the flowchart 100, the master M proceeds to implement a Group 3 designation method unless the number of designated cellular handsets equals the maximum number of active slaves or the available throughput AT has been exhausted during the implementation of the flowchart 100.

Figure 7:
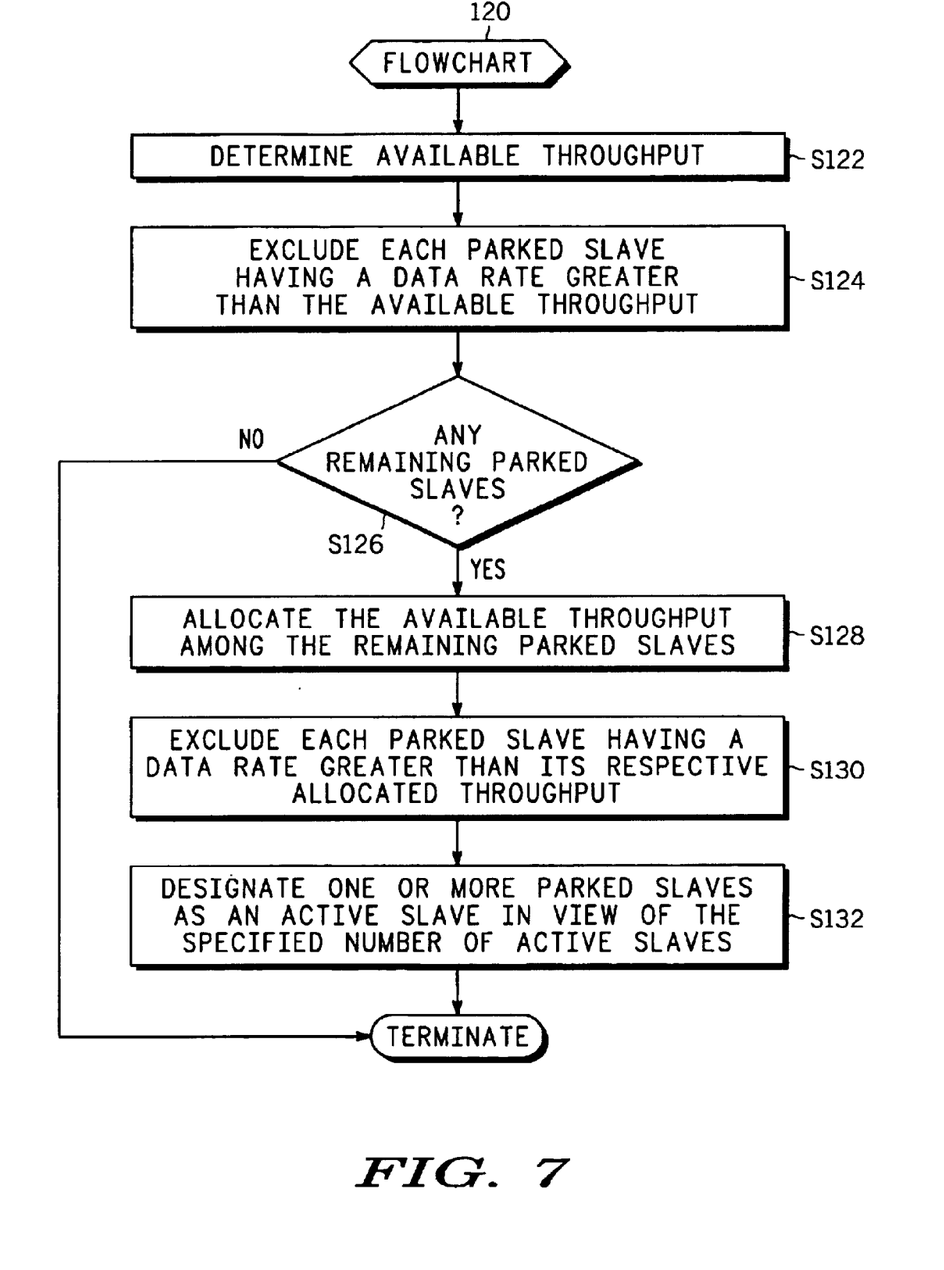
FIG. 7 illustrates a flowchart representative of a Group 3 designation method in accordance with one embodiment of the present invention.

FIG. 7 illustrates a flowchart 120 representative of the Group 3 designation method of the present invention. During a stage S122 of the flowchart 120, the master M determines the available throughput AT based upon an adjustment or cumulative adjustments of the available throughput AT from the implementation of the flowcharts 80 and 100. During a stage S124 of the flowchart 120, the master M excludes each parked slave having an available data rate with the cell site 11 that is greater than the available throughput AT. If there are no remaining parked slaves within the Group 3 after completion of the stage S124, then the master M terminates the flowchart 120. Otherwise, the master M proceeds to a stage S128 of the flowchart 120 to allocate the available throughput AT among the remaining parked slaves. The allocation can involve an equal or unequal division of the available throughput. During a stage S130 of the flowchart 120, the master M excludes each parked slave cellular handset having a data rate greater than its respective allocated throughput. During a stage S132 of the flowchart 120, the master M designates one or more of parked slaves as an active slave in view of the specified number of active slaves to be supported by the master M.

Referring again to FIG. 3, during a stage S50 of the flowchart 40, each parked slave cellular handset that was not designated as an active slave will determine its respective status as to further attempts to be designated as an active slave.

From the description of various flowcharts illustrated in FIGS. 2–6, those having ordinary skill in the art will appreciate various benefits of the present invention. One of the benefits is a facilitation of a designation of an optimal number of active slaves within the available throughput of the piconet 13.

The description herein of the present invention as illustrated in FIGS. 3–7 was in the context of the cellular handset CH10 (FIG. 1) being a master M (FIG. 2) and the cellular handsets CH1–CH9 and CH11–CH13 (FIG. 1) being parked salves PS1–PS12 (FIG. 2) with an initial implementation of the active slave designation method (FIG. 3) of the present invention. Upon completion of an initial implementation of the active slave designation method, any change thereafter in one or more signal conditions related to communications among the cellular handsets CH1–CH13 or any change thereafter in one or more signal conditions between one or more of the cellular handsets CH1–CH13 and the cell site 11 necessitates a subsequent implementation of the active slave designation method to include the assignment of sequential weights to both active slave(s) and parked slave(s) within the piconet 13. This may result in a demotion of an active slave to a parked slave and a promotion of one of the parked slaves to an active slave.

An initial implementation of the active slave designation method within the piconet 13 can also be in the context of a master, one or more active slaves transmitting active slave requests to the master in attempting to maintain an active status, and one or more parked slaves transmitting active slave requests to the master in attempting to be granted an active status.

While the present invention was described in the context of cellular handsets and a cell site within a piconet, the present invention can be implemented in an employment of other types of wireless devices and base sites within a piconet having ad hoc networking technology, such as, for example, a Personal Data Assistant and a corresponding base site.

Figure 8:
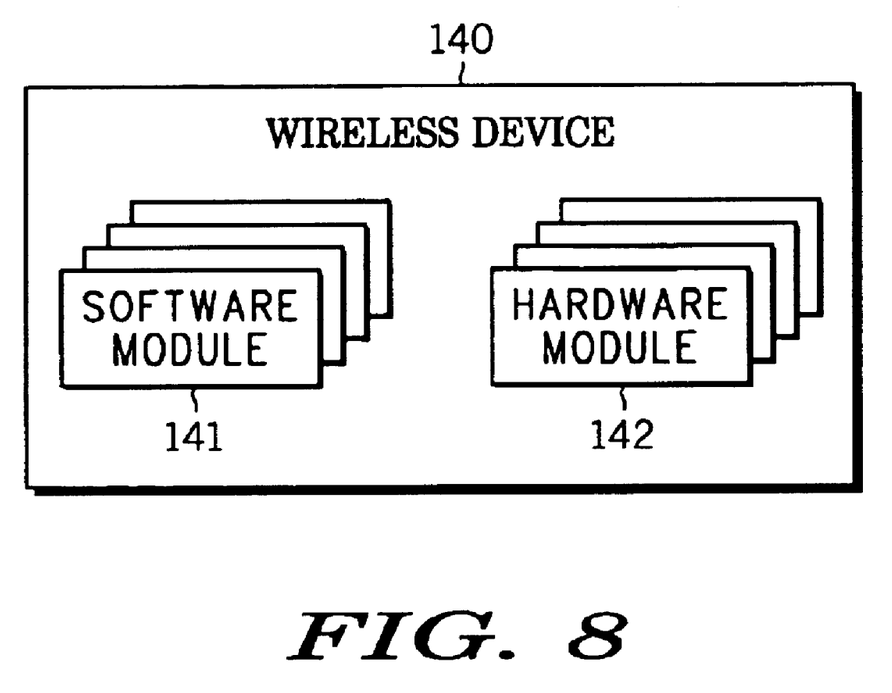
FIG. 8 illustrates one embodiment of a wireless device in accordance with the present invention.

FIG. 8 illustrates a wireless device 140. In addition to conventional ad hoc networking technology (e.g., Bluetooth), the wireless device 140 employing the present invention (e.g., the cellular handsets illustrated in FIG. 2) further includes one or more software modules 141, one or more hardware modules 142, and/or a combination thereof with each module being designed as would be appreciated by those having ordinary skill in the art to implement one or more stages of the illustrated flowcharts of FIGS. 3–7 or alternative embodiments thereof within the spirit of the present invention.

The piconet 13 (FIG. 2) was illustrated for purposes of describing various methods of the present invention. The number of piconet configurations employing the present invention is essentially limitless as will be appreciated by those having ordinary skill in the art.

The terms "piconet", "master", "active slave", and "parked slave" have established definitions within the preferred Bluetooth protocol. For purposes of the present invention, those established definitions are inclusive of the established definitions of counterpart terms within other protocols that may be utilized in an implementation of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method of operating a master wireless device in designating one or more active slave wireless devices from a plurality of slave wireless devices, said method comprising:

assigning sequential weights to each slave wireless device of the plurality of slave wireless devices;

designating one or more of the plurality of slave wireless devices as the one or more active slave wireless devices based partially or entirely on the assigned sequential weights; and wherein said designation of one or more of the plurality of slave wireless devices as the one or more active slave wireless device is further based on an available throughput between the master wireless device and a base site.

2. The method of claim 1, further comprising:
receiving active slave requests from a plurality of parked slave wireless devices serving as the plurality of slave wireless devices.

3. The method of claim 1, further comprising:
receiving active slave requests from one or more parked slave wireless devices and one or more active slave wireless devices collectively serving as the plurality of slave wireless devices.

4. The method of claim 1, wherein said designation of a first slave wireless device as an active slave wireless device is further based on an available throughput between the master wireless device and a first slave wireless device.

5. The method of claim 1, further comprising:
excluding one or more slave wireless devices from the plurality of slave wireless device prior to the assigning of the sequential weights to each slave wireless device, wherein each slave wireless device excluded from the plurality of slave wireless devices achieves a first data rate through a first direct connection with a base site that is greater than a second date rate achieved by the master wireless device through a second direct connection with the base site.

6. A method of operating a master wireless device in designating one or more active slave wireless devices from a plurality of slave wireless devices, said method comprising:
assigning each slave wireless device of the plurality of slave wireless devices to one group of a plurality of ranked groups representative of various types of traffic types between the slave wireless devices and a base site;
sorting the slave wireless devices within each group having two or more slave wireless devices; and
designating one or more of the slave wireless devices as the one or more active slave wireless devices based partially or entirely on a ranking of the groups and the sorting within each group having two or more slave wireless devices.

7. The method of claim 6, further comprising:
receiving active slave requests from a plurality of parked slave wireless devices serving as the plurality of slave wireless devices.

8. The method of claim 6, further comprising:
receiving active slave requests from one or more parked slave wireless devices and one or more active slave wireless devices collectively serving as the plurality of slave wireless devices.

9. The method of claim 6, wherein said designation of one or more of the plurality of slave wireless devices as the one or more active slave wireless device is further based on a specified number of active slave wireless devices to be supported by the master wireless device.

10. The method of claim 6, wherein said designation of one or more of the plurality of slave wireless devices as the one or more active slave wireless device is further based on an available throughput between the master wireless device and a base site.

11. The method of claim 6, wherein said designation of a first slave wireless device as an active slave wireless device is further based on an available throughput between the master wireless device and a first slave wireless device.

12. The method of claim 6, further comprising:
excluding one or more slave wireless devices from the plurality of slave wireless device prior to the assigning of the sequential weights to each slave wireless device, wherein each slave wireless device excluded from the plurality of slave wireless devices achieves a first data rate through a first direct connection with a base site that is greater than a second data rate achieved by the master wireless device through a second direct connection with the base site.

13. A method of operating a master wireless device in designating one or more active slave wireless devices, said method comprising:
conditionally designating each slave wireless device within a first group as an active slave wireless device, the first group being representative of slave wireless devices lacking coverage with a base site;
conditionally designating each slave wireless device within a second group as an active slave wireless device, the second group being representative of slave wireless devices having adequate coverage with the base site and a data call associated with a data rate less than a minimum data rate threshold; and
conditionally designating each slave wireless device within a third group as an active slave wireless device, the third group being representative of slave wireless devices having adequate coverage with the base site and a data call associated with a data rate equal to or greater than a minimum system data rate threshold.

14. The method of claim 13, further comprising:
excluding a first slave wireless device from the first group, the second group, and the third group when the first slave wireless device achieves a first data rate through a first direct connection with the base site that is greater than a second data rate achieved by the master wireless device through a second direct connection with the base site.

15. A system, comprising:
a master wireless device; and
a plurality of slave wireless devices,
wherein said master wireless device is operable to assign sequential weights to each slave wireless device,
wherein said master wireless device is further operable to designate one or more of said plurality of slave wireless devices as one or more active slave wireless device based partially or entirely on the assigned sequential weights; and
wherein said master wireless device designates one or more of said plurality of slave wireless devices as one or more active slave wireless device based partially or entirely on the assigned sequential weights and an available throughput between said master wireless device and a base site.

16. The system of claim 15, wherein said plurality of slave wireless devices include one or more parked slave wireless devices.

17. The system of claim 15, wherein said plurality of slave wireless devices include one or more active slave wireless devices.

18. The system of claim 15,
wherein said master wireless device assigns each slave wireless device to one group of a plurality of ranked groups representative of various types of traffic types between the slave wireless devices and a base site, and
wherein said master wireless device sorts the slave wireless devices within each group having two or more slave wireless devices to thereby assign sequential weights to each slave wire device.

19. The system of claim 15, wherein said master wireless device designates one or more of said plurality of slave wireless devices as one or more active slave wireless device based partially or entirely on the assigned sequential weights and a specified number of active slave wireless devices to be supported by the master wireless device.

20. The system of claim 15,
wherein said master wireless device is further operable to exclude one or more slave wireless devices from the plurality of slave wireless device prior to the assigning of the sequential weights to each slave wireless device, and
wherein each slave wireless device excluded from the plurality of slave wireless devices achieves a first data rate through a first direct connection with a base site that is greater than a second data rate achieved by the master wireless device through a second direct connection with the base site.

21. A system, comprising:
a master wireless device; and
one or more slave wireless devices,
wherein said master wireless device is operable to assign said one or more slave wireless devices to a group representative of a traffic type between a base site and said one or more slave wireless devices, and
wherein said master wireless device is further operable to conditionally designate each slave wireless device within said group as an active slave wireless device.

22. The system of claim 21,
wherein said group lacks adequate coverage with the base site, and
wherein said traffic type includes real-time data.

23. The system of claim 21,
wherein said group lacks adequate coverage with the base site, and
wherein said traffic type includes non-real time data.

24. The system of claim 21,
wherein said group has adequate coverage with the base site, and
wherein said traffic type includes data calls having a data rate less than a minimum system data rate threshold.

25. The system of claim 21,
wherein said group has adequate coverage with the base site, and
wherein said traffic type includes data calls having a data rate equal to or greater than a minimum system data rate threshold.

26. A wireless device, comprising:
a first set of one or more modules operable to conditionally designate each slave wireless device within a first group as an active slave wireless device, the first group being representative of slave wireless devices lacking coverage with a base site;

a second set of one or more modules operable to conditionally designate each slave wireless device within a second group as an active slave wireless device, the second group being representative of slave wireless devices having adequate coverage with the base site and a data call associated with a data rate less than a minimum data rate threshold; and a third set of one or more modules operable to conditionally designate each slave wireless device within a third group as an active slave wireless device, the third group being representative of slave wireless devices having adequate coverage with the base site and a data call associated with a data rate equal to or greater than a minimum system data rate threshold.

* * * * *